US009328789B2

(12) United States Patent
Ogawa et al.

(10) Patent No.: US 9,328,789 B2
(45) Date of Patent: May 3, 2016

(54) VIBRATION DAMPING DEVICE FOR RAILWAY VEHICLE (75) Inventors: Takayuki Ogawa, Sagamihara (JP); Jun Aoki, Sagamihara (JP); Tsutomu Suzuki, Kawasaki (JP); Masaru Uchida, Hachioji (JP); Chie Yabuki, Yokohama (JP)

(73) Assignee: KYB Corporation, Tokyo (JP)

( * ) Notice: Subject to any disclaimer, the term of this patent is extended or adjusted under 35 U.S.C. 154(b) by 6 days.

(21) Appl. No.: 14/115,768

(22) PCT Filed: Aug. 6, 2012

(86) PCT No.: PCT/JP2012/069958
§ 371 (c)(1),
(2), (4) Date: Nov. 5, 2013

(87) PCT Pub. No.: WO2013/021963
PCT Pub. Date: Feb. 14, 2013

(65) Prior Publication Data
US 2014/0083807 A1 Mar. 27, 2014

(30) Foreign Application Priority Data

Aug. 11, 2011 (JP) ................................ 2011-175562

(51) Int. Cl.
*F16F 9/34* (2006.01)
*F16F 9/18* (2006.01)
(Continued)

(52) U.S. Cl.
CPC . *F16F 9/18* (2013.01); *B61F 5/245* (2013.01); *F15B 7/006* (2013.01); *F16F 9/006* (2013.01);
(Continued)

(58) Field of Classification Search
CPC ............... B61F 5/245; F16F 9/46; F16F 9/19; F16F 9/006; F15B 7/006; F15B 2211/785; F15B 2211/7053

USPC ................ 188/314, 266.2; 60/469, 473, 477
See application file for complete search history.

(56) References Cited

U.S. PATENT DOCUMENTS 4,359,931 A * 11/1982 Palmersheim et al. ......... 91/436
2006/0207247 A1* 9/2006 Nagai et al. ..................... 60/413
(Continued)

FOREIGN PATENT DOCUMENTS

EP 2330302 A1 6/2011
JP S55-135210 A 10/1980
(Continued)

OTHER PUBLICATIONS

Machine Translation in English for JP 2006-137294A; Inventor: Arai et al.; 5 pages; Retrieve Date: Aug. 4, 2015.*
(Continued)

*Primary Examiner* — Thomas J Williams
*Assistant Examiner* — Mariano Sy
(74) *Attorney, Agent, or Firm* — Rabin & Berdo, P.C.

(57) ABSTRACT

A vibration damping device for railway vehicle includes an actuator and a damper circuit that causes the actuator to function as a damper. The actuator includes a cylinder coupled to a truck of a railway vehicle, a piston, a rod coupled to the piston and a body, a rod-side chamber and a piston-side chamber inside the cylinder, a first on-off valve for a first passage that communicates between a rod-side chamber and a piston-side chamber, a second on-off valve for a second passage that communicates between the piston-side chamber and a tank, and a pump that supplies a hydraulic fluid into the rod-side chamber. The hydraulic fluid has such kinematic viscosity-temperature characteristics that a kinematic viscosity of the hydraulic fluid ranges from 7 mm$^2$/s to 50 mm$^2$/s in a temperature range of from 20° C. to 60° C.

8 Claims, 5 Drawing Sheets (51) Int. Cl.
*B61F 5/24* (2006.01)
*F16F 9/46* (2006.01)
*F15B 7/00* (2006.01)
*F16F 9/00* (2006.01)
*F16F 9/19* (2006.01)

(52) U.S. Cl.
CPC ... *F16F 9/19* (2013.01); *F16F 9/46* (2013.01); *F15B 2211/7053* (2013.01); *F15B 2211/785* (2013.01)

(56) References Cited

U.S. PATENT DOCUMENTS

| | | | |
|---|---|---|---|
| 2009/0314017 A1 | 12/2009 | Nishimura et al. | |
| 2011/0192157 A1* | 8/2011 | Ogawa | 60/469 |
| 2013/0248306 A1* | 9/2013 | Ogawa et al. | 188/266.2 |
| 2014/0116826 A1* | 5/2014 | Ogawa et al. | 188/266.2 |
| 2014/0196628 A1* | 7/2014 | Ogawa et al. | 105/199.1 |

FOREIGN PATENT DOCUMENTS

| | | |
|---|---|---|
| JP | 2000-289977 A | 10/2000 |
| JP | 2005-299450 A | 10/2005 |
| JP | 2005299450 A * | 10/2005 |
| JP | 2006137294 A * | 6/2006 |
| JP | 2007-163106 A | 6/2007 |
| JP | 2008-247204 A | 10/2008 |
| JP | 2009-185915 A | 8/2009 |
| JP | 2010-065797 A | 3/2010 |
| JP | 2011-088623 A | 5/2011 |
| WO | WO-2010/043503 A1 | 4/2010 |

OTHER PUBLICATIONS

Yuatsu Sadoyu 1 [Japanese Industrial Standard JIS Gail [Tai Mamosei Sadoyu], [online], Loyal Yuki Kabushiki Kaisha, 2009, [retrieval date Aug. 20, 2012 J, Internet <URL: http://www.loyal-grease.jp/pdf/ioil/tmso.pdf>.

Yuatsu Sadoyu 2 [Japanese Industrial Standard JIS Gail [Ko Nendo Shisu Yuatsu Sadoyu], [online], Loyal Yuki Kabushiki Kaisha, 2009, [retrieval date Aug. 20, 2012], Internet <URL:http://www.loyal-grease.jp/pdf/ioil/nsso.pdf>.

Office Action issued by Japan Patent Office dated Dec. 24, 2013 and its English translation.

Extended European Search Report dated Apr. 20, 2015.

* cited by examiner

VIBRATION DAMPING DEVICE FOR RAILWAY VEHICLE

TECHNICAL FIELD

The present invention relates to an improvement of a vibration damping device for railway vehicle.

BACKGROUND ART

A vibration damping device for railway vehicle is known to be interposed between a body and a truck of a railway vehicle, and to suppress vibration that acts on the railway vehicle and occurs in a right-and-left direction with respect to an advancing direction of the body.

JP 2010-65797 A discloses a vibration damping device for railway vehicle. The vibration damping device for railway vehicle includes a cylinder coupled to one of a truck and a body of a railway vehicle, a piston slidably inserted into the cylinder; a rod inserted into the cylinder and coupled to the piston and another one of the truck and the body, a rod-side chamber and a piston-side chamber partitioned by the piston inside the cylinder, a tank, a first on-off valve provided in a middle of a first passage for communicating between the rod-side chamber and the piston-side chamber, a second on-off valve provided in a middle of a second passage for communicating between the piston-side chamber and the tank, a pump for supplying a hydraulic fluid into the rod-side chamber, a discharge passage for connecting the rod-side chamber to the tank, and a variable relief valve provided in a middle of the discharge passage and capable of varying a valve opening pressure.

The vibration damping device for railway vehicle drives the pump, the first on-off valve, the second on-off valve, and the variable relief valve. Thus, the vibration damping device for railway vehicle exerts a thrust in both extending and contracting directions, and suppresses vibration of the body using the thrust. The vibration damping device for railway vehicle further includes a damper circuit so as to be capable of functioning as a passive damper under a state in which the first on-off valve and the second on-off valve are closed.

SUMMARY OF INVENTION

In a case of functioning as an actuator, the vibration damping device for railway vehicle drives the pump at constant rotational speed, and drives the first on-off valve, the second on-off valve, and the variable relief valve as appropriate depending on a vibration condition of the body, to thereby obtain the thrust that suppresses vibration of the body using a hydraulic pressure and to suppress vibration of the railway vehicle. Here, when a temperature of the hydraulic fluid in the circuit is low, a kinematic viscosity of the hydraulic fluid is high. Accordingly, in a case where the actuator is caused to exert a relatively small thrust, a pressure loss due to resistance in the variable relief valve, a pipe, and the like is increased, and hence a pressure in the cylinder is extremely high, with the result that the thrust is excessive.

In a case of feedback control of the thrust of the actuator, an excessive thrust increases a deviation between a control command and the thrust, and hence hunting occurs which the thrust of the actuator continuously varies. As a result, vibration of the body may be aggravated.

It is an object of the present invention to provide a vibration damping device for railway vehicle capable of preventing hunting of the thrust when a temperature of the hydraulic fluid is low, capable of exerting a stable thrust, and capable of effectively suppressing vibration of the body.

According to one aspect of the present invention, a vibration damping device for railway vehicle suppressing vibration of a body of a railway vehicle comprises an actuator including a cylinder coupled to one of a truck and the body of the railway vehicle; a piston slidably inserted into the cylinder; a rod inserted into the cylinder and coupled to the piston and another one of the truck and the body; a rod-side chamber and a piston-side chamber partitioned by the piston inside the cylinder; a tank; a first on-off valve provided in a middle of a first passage that communicates between the rod-side chamber and the piston-side chamber; a second on-off valve provided in a middle of a second passage that communicates between the piston-side chamber and the tank; and a pump capable of supplying a hydraulic fluid into the rod-side chamber; and a damper circuit adapted to cause the actuator to function as a damper under a state in which the first on-off valve and the second on-off valve are closed, wherein the hydraulic fluid has such kinematic viscosity-temperature characteristics that a kinematic viscosity of the hydraulic fluid ranges from 7 mm$^2$/s to 50 mm$^2$/s in a temperature range of from 20° C. to 60° C.

Embodiments of the present invention and advantages thereof are described in detail below with reference to the accompanying drawings.

DESCRIPTION OF EMBODIMENTS

Figure 1:
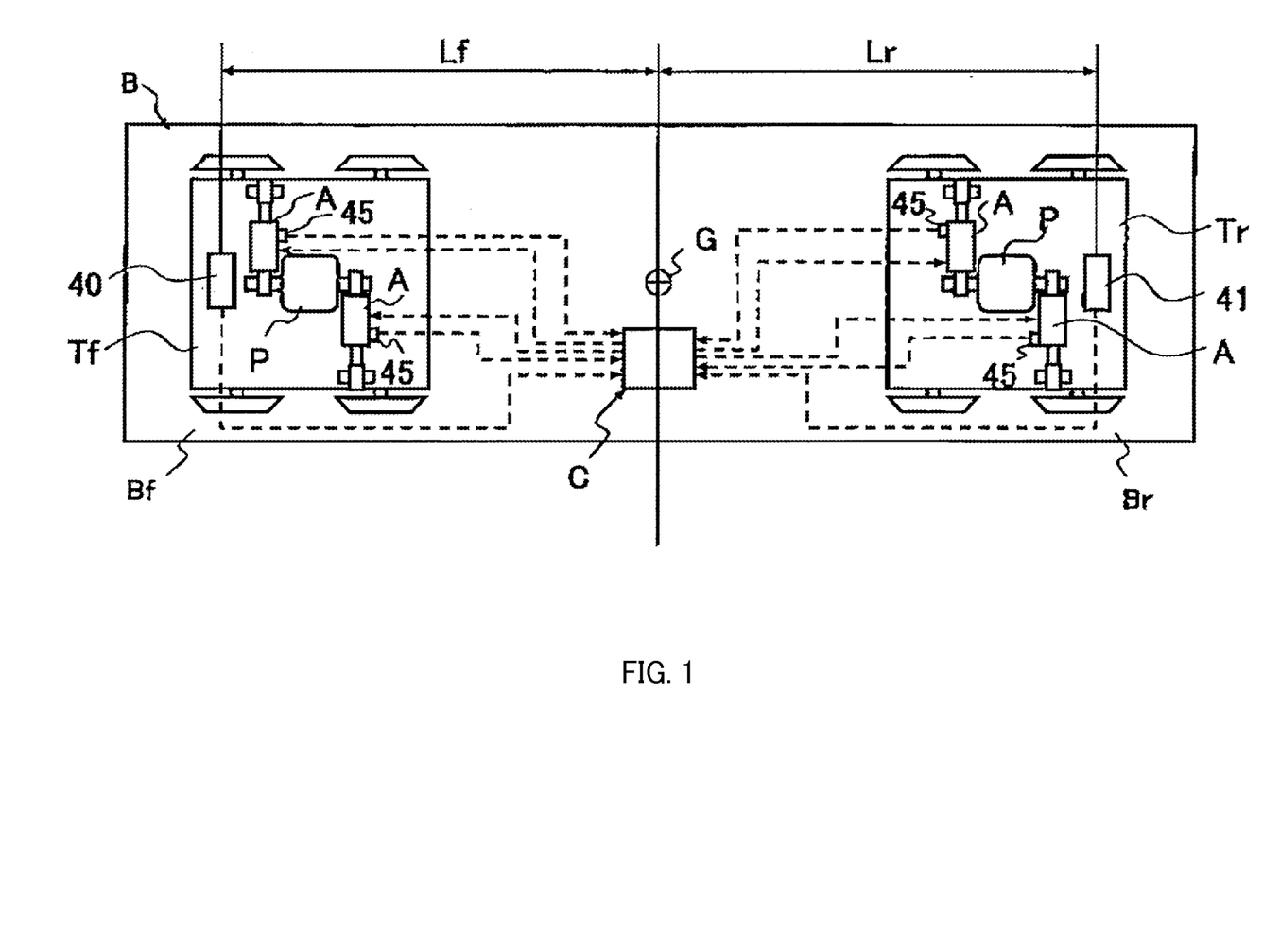
FIG. 1 is a schematic plan view of a railway vehicle in which a vibration damping device for railway vehicle according to an embodiment of the present invention is installed.

A vibration damping device for railway vehicle 1 according to an embodiment of the present invention is used as a vibration damping device for a body B of a railway vehicle. As illustrated in FIG. 1, the vibration damping device for railway vehicle 1 includes pairs of actuators A interposed between a front truck Tf and the body B and between a rear truck Tr and the body B, a damper circuit D (FIG. 2) for causing the actuators A to function as dampers, and a controller C for controlling the actuators A so as to suppress vibration of the body B.

Each pair of actuators A is coupled to a pin P suspended below the body B of the railway vehicle, and is interposed in parallel between the body B and the front truck Tf and between the body B and the rear truck Tr.

The four actuators A perform active control to suppress horizontal vibration of the body B with respect to a vehicle advancing direction. The controller C controls all of the actuators A to suppress lateral vibration of the body B.

When performing control to suppress vibration of the body B, the controller C detects a lateral acceleration αf of a front portion Bf of the body B that is produced in a horizontal direction with respect to the vehicle advancing direction, and detects a lateral acceleration αr of a rear portion Br of the body B that is produced in the horizontal direction with respect to the vehicle advancing direction. Based on the lateral accelerations αf, αr, the controller further obtains a yaw acceleration ω that is an angular acceleration produced about a center G of the body, and obtains a sway acceleration β that is a horizontal acceleration produced at the center G of the body B.

Based on the yaw acceleration ω and the sway acceleration β, the controller further obtains control force command values Ff, Fr as thrusts that are to be generated by the respective actuators A. The controller performs feedback control to cause the actuators A to generate the thrusts corresponding to the control force command values Ff, Fr, and thus suppresses lateral vibration of the body B. It should be noted that the control force command value Ff corresponds to the thrust that is to be generated by the actuator A arranged on a front side of the vehicle, and the control force command value Fr corresponds to the thrust that is to be generated by the actuator A arranged on a rear side of the vehicle.

Specific configurations of the actuators A are described. It should be noted that in this embodiment, one controller C controls four actuators A, but the controller C may be provided to each of the actuators A.

Figure 2:
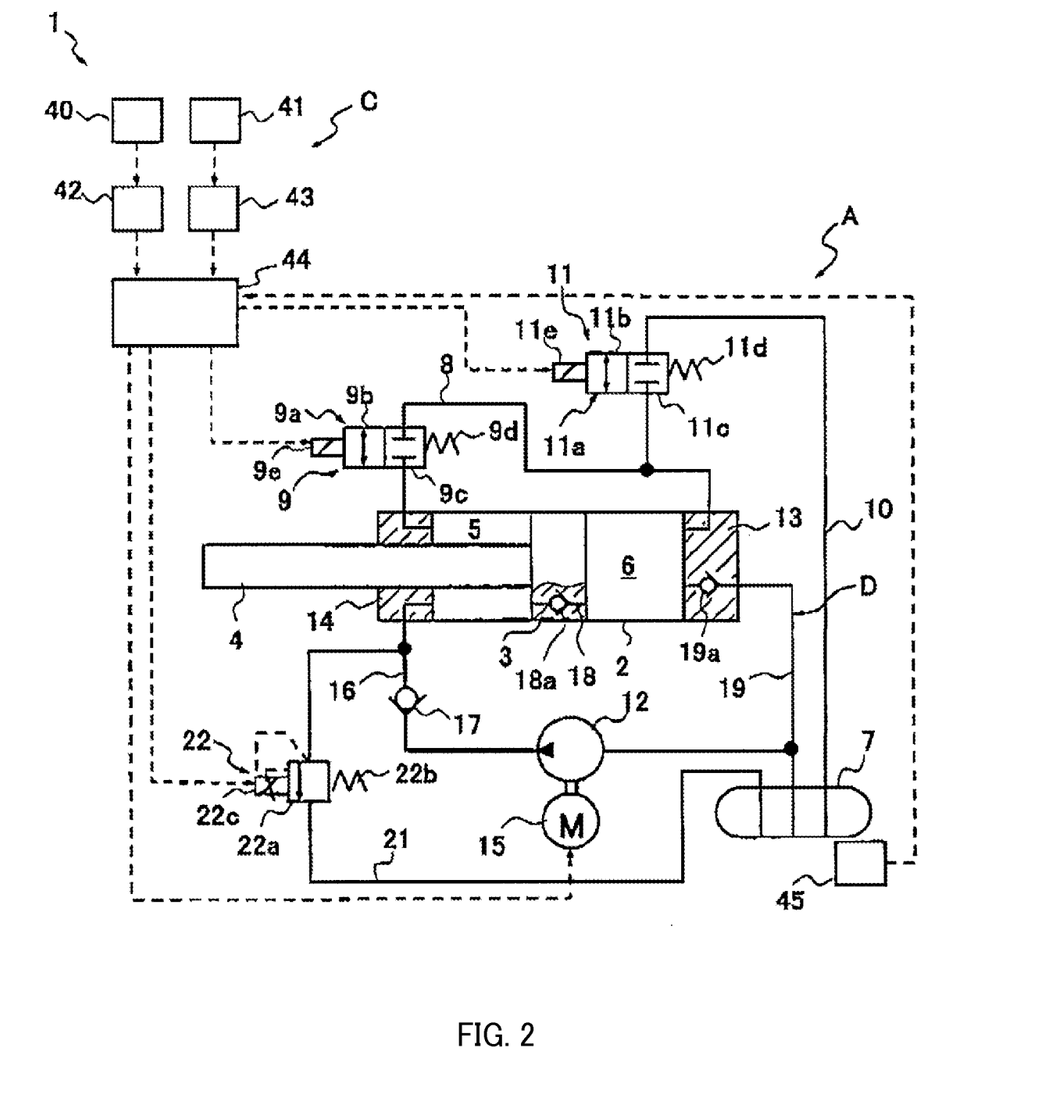
FIG. 2 is a circuit diagram of an actuator of the vibration damping device for railway vehicle according to the embodiment of the present invention.

As illustrated in FIG. 2, the actuator A functions as an actuator of a single-rod type, and includes a cylinder 2 coupled to one of the body B and the front truck Tf of the railway vehicle and one of the body B and the rear truck Tr, a piston 3 slidably inserted into the cylinder 2; a rod 4 inserted into the cylinder 2 and coupled to the piston 3 and another one of the body B and the front truck Tf and another one of the body B and the rear truck Tr, a rod-side chamber 5 and a piston-side chamber 6 partitioned by the piston 3 inside the cylinder 2, a tank 7, a first on-off valve 9 provided in a middle of a first passage 8 for communicating between the rod-side chamber 5 and the piston-side chamber 6, a second on-off valve 11 provided in a middle of a second passage 10 for communicating between the piston-side chamber 6 and the tank 7, and a pump 12 for supplying a hydraulic fluid into the rod-side chamber 5.

The rod-side chamber 5 and the piston-side chamber 6 are filled with the hydraulic fluid, and the tank 7 is filled with a gas in addition to the hydraulic fluid. It should be noted that it is not necessary to keep the gas compressed and pressurized in an inside of the tank 7.

The first on-off valve 9 is opened to bring the first passage 8 into a communication state, and the second on-off valve 11 is closed to drive the pump 12. Thus, the actuator A is operated to extend. The second on-off valve 11 is opened to bring the second passage 10 into a communication state, and the first on-off valve 9 is closed to drive the pump 12. Thus, the actuator A is operated to contract.

In the following, components of the actuator A are described in detail.

The cylinder 2 has a cylindrical shape. A right end of the cylinder 2 illustrated in FIG. 2 is closed by a lid 13, and an annular rod guide 14 is fixed to a left end thereof illustrated in FIG. 2. The rod 4, which is movably inserted into the cylinder 2, is slidably inserted into the rod guide 14. The rod 4 has one end protruding from the cylinder 2, and has another end coupled to the piston 3 that is slidably inserted into the cylinder 2.

A seal member (not shown) seals a gap between an outer periphery of the rod 4 and the rod guide 14, and thus the inside of the cylinder 2 is kept sealed. The rod-side chamber 5 and the piston-side chamber 6 partitioned by the piston 3 inside the cylinder 2 are filled with the hydraulic fluid.

Further, a sectional area of the rod 4 is set to a half of a sectional area of the piston 3, and a pressure receiving area of the piston 3 on the rod-side chamber 5 side is set to a half of a pressure receiving area thereof on the piston-side chamber 6 side. Thus, if a pressure in the rod-side chamber 5 is equal at the time of both extension operation and contraction operation, thrusts to be generated in both extension and contraction are equalized, with the result that a hydraulic fluid amount with respect to a displacement amount of the actuator A is also equal in both extension and contraction.

In a case where the actuator A is operated to extend, the rod-side chamber 5 and the piston-side chamber 6 are communicated to each other, and hence the pressure in the rod-side chamber 5 and the pressure in the piston-side chamber 6 are equal to each other. In this case, the thrust to be generated by the actuator A corresponds to a value that is obtained by multiplying a difference in the pressure receiving area of the piston 3 between the rod-side chamber 5 side and the piston-side chamber 6 side by the above-mentioned pressure.

In a case where the actuator A is operated to contract, communication between the rod-side chamber 5 and the piston-side chamber 6 is cut off, and thus the piston-side chamber 6 is communicated to the tank 7. In this case, the thrust to be generated by the actuator A corresponds to a value that is obtained by multiplying the pressure in the rod-side chamber 5 by the pressure receiving area of the piston 3 on the rod-side chamber 5 side.

That is, in both extension and contraction, the thrust to be generated by the actuator A corresponds to a value that is obtained by multiplying a half of the sectional area of the piston 3 by the pressure in the rod-side chamber 5. Therefore, in a case of controlling the thrust of the actuator A, in both extension operation and contraction operation, it is only necessary to control the pressure in the rod-side chamber 5. The pressure receiving area of the piston 3 on the rod-side chamber 5 side is set to the half of the pressure receiving area thereof on the piston-side chamber 6 side. Hence, in a case where the same thrust is generated in extension and contraction, it is only necessary to perform control so as to set the pressure in the rod-side chamber 5 to the same value at the time of extension and contraction. Accordingly, control is simplified, and in addition, a flow rate of the hydraulic fluid with respect to the displacement amount is equalized in extension and contraction. Thus, there is an advantage that responsiveness is equalized at the time of extension and contraction.

It should be noted that even in a case where the pressure receiving area of the piston 3 on the rod-side chamber 5 side is not set to the half of the pressure receiving area thereof on the piston-side chamber 6 side, similarly to the above-mentioned case, the pressure in the rod-side chamber 5 is controlled, and thus the thrust of the actuator A at the time of extension and contraction can be controlled.

Fixing portions (not shown) are provided respectively to the left end of the rod 4 illustrated in FIG. 2 and the lid 13 for closing the right end of the cylinder 2. Due to the fixing portions, the actuator A is interposed between the body B and the truck Tf of the railway vehicle and between the body B and the truck Tr thereof.

The rod-side chamber 5 and the piston-side chamber 6 are communicated to each other through the first passage 8, and the first on-off valve 9 is provided in the middle of the first passage 8. It should be noted that the first passage 8 communicates between the rod-side chamber 5 and the piston-side chamber 6 outside the cylinder 2, but the first passage 8 may be provided in the piston 3.

The first on-off valve 9 is formed of a solenoid on-off valve, and includes a valve 9a having a communicating position 9b at which the valve 9a opens the first passage 8 to communicate between the rod-side chamber 5 and the piston-side chamber 6 and an interrupting position 9c at which the valve 9a interrupts communication between the rod-side chamber 5 and the piston-side chamber 6, a spring 9d for biasing the valve 9a so as to situate the valve 9a at the interrupting position 9c, and a solenoid 9e for switching the valve 9a to the communicating position 9b against a biasing force of the spring 9d at the time of energization.

The piston-side chamber 6 and the tank 7 are communicated to each other through the second passage 10. The second on-off valve 11 is provided in the middle of the second passage 10. The second on-off valve 11 is formed of a solenoid on-off valve, and includes: a valve 11a having a communicating position 11b at which the valve 11a opens the second passage 10 to communicate between the piston-side chamber 6 and the tank 7, and an interrupting position 11c at which the valve 11a interrupts communication between the piston-side chamber 6 and the tank 7; a spring 11d for biasing the valve 11a so as to situate the valve 11a at the interrupting position 11c; and a solenoid 11e for switching the valve 11a to the communicating position 11b against a biasing force of the spring 11d at the time of energization.

The pump 12 is driven by a motor 15, and discharges the hydraulic fluid in only one direction. A discharge port of the pump 12 is communicated to the rod-side chamber 5 through a supply passage 16, and a suction port of the pump 12 is communicated to the tank 7. When the pump 12 is driven by the motor 15, the pump 12 sucks the hydraulic fluid stored in the tank 7, and then supplies the hydraulic fluid into the rod-side chamber 5. The motor 15 rotates at predetermined normal rotational speed so as to rotate and drive the pump 12 at constant rotational speed. The normal rotational speed is determined so as to satisfy both a pressure that is needed to exert a maximum thrust required for the actuator A, and response speed that is required to exert a thrust for driving the first on-off valve 9, the second on-off valve 11, and a variable relief valve 22 described later.

The pump 12 discharges the hydraulic fluid in only one direction, and does not require switching operation in a rotational direction. Accordingly, the pump 12 is free from a problem in that a discharge amount varies at the time of rotation switching, and hence an inexpensive gear pump or the like can be used. In addition, the rotational direction of the pump 12 is always the same, and hence the rotational direction of the motor 15, which serves as a drive source for driving the pump 12, is also always the same. Accordingly, high responsiveness to rotation switching is not required, and thus the inexpensive motor 15 can be used. It should be noted that in a middle of the supply passage 16, there is provided a check valve 17 for preventing a backflow of the hydraulic fluid from the rod-side chamber 5 into the pump 12.

When the actuator A is operated to extend under a state in which the pump 12 supplies the hydraulic fluid into the rod-side chamber 5 at a predetermined discharge flow rate, the first on-off valve 9 is opened, and the second on-off valve 11 is opened and closed. Thus, the pressure in the rod-side chamber 5 is adjusted. At this time, the rod-side chamber 5 and the piston-side chamber 6 are brought into a communication state, and the pressure in the piston-side chamber 6 is equal to the pressure in the rod-side chamber 5. Further, when the actuator A is operated to contract, the second on-off valve 11 is opened, and the first on-off valve 9 is opened and closed. Thus, the pressure in the rod-side chamber 5 is adjusted. In this way, it is possible to generate the thrust corresponding to the control force command value Ff (Fr).

That is, in the actuator A, at the time of both extension operation and contraction operation, the pressure in the rod-side chamber 5 is controlled, and thus the thrust can be adjusted. It should be noted that each of the first on-off valve 9 and the second on-off valve 11 may be formed of a variable relief valve having an opening/closing function capable of adjusting a valve opening pressure. In this case, instead of performing opening/closing operation of the first on-off valve 9 or the second on-off valve 11 at the time of extension/contraction operation, through adjustment of the valve opening pressure, the thrust of the actuator A can be also adjusted.

Further, the thrust corresponding to the control force command value Ff (Fr) can be also generated through adjustment of the discharge flow rate of the pump 12. In this case, when providing a pressure sensor for detecting the pressure in the rod-side chamber 5, a sensor for detecting torque acting on the motor 15 or a rotation shaft of the pump 12, a load sensor for obtaining load acting on the rod 4, or a strain sensor for detecting strain of the rod 4, the thrust to be output by the actuator A can be measured.

As described above, the thrust of the actuator A can be adjusted. However, in order that the thrust can be adjusted more easily, the vibration damping device for railway vehicle 1 according to this embodiment includes a discharge passage 21 for connecting between the rod-side chamber 5 and the tank 7, and the variable relief valve 22 which is provided in a middle of the discharge passage 21 and is capable of varying the valve opening pressure.

The variable relief valve 22 is formed of a proportional solenoid relief valve, and includes a valve element 22a provided in the middle of the discharge passage 21, a spring 22b for biasing the valve element 22a so as to interrupt the discharge passage 21, and a proportional solenoid 22c for generating the thrust against the biasing force of the spring 22b at the time of energization. The variable relief valve 22 adjusts the valve opening pressure through adjustment of an amount of electric current flowing through the proportional solenoid 22c.

When the pressure applied to the valve element 22a exceeds a relief pressure (valve opening pressure), the variable relief valve 22 opens the discharge passage 21. That is, when the pressure in the rod-side chamber 5 provided on an upstream side of the discharge passage 21 exceeds the relief pressure (valve opening pressure), a resultant force of a thrust resulting from the above-mentioned pressure that presses the valve element 22a so as to open the discharge passage 21 and of a thrust caused by the proportional solenoid 22c overcomes the biasing force of the spring 22b that biases the valve element 22a so as to interrupt the discharge passage 21. In this way, the valve element 22a is retreated, and the discharge passage 21 is opened.

Further, the variable relief valve 22 is set so that the thrust to be generated by the proportional solenoid 22c is increased as the electric current to be supplied to the proportional solenoid 22c is increased. When the electric current to be supplied to the proportional solenoid 22c is maximum, the valve opening pressure is minimum. In contrast, when no electric current is supplied to the proportional solenoid 22c, the valve opening pressure is maximum.

Therefore, at the time of extension/contraction operation of the actuator A, when the pressure in the rod-side chamber 5 is adjusted to the valve opening pressure of the variable relief valve 22, the pressure in the rod-side chamber 5 can be easily adjusted through adjustment of the valve opening pressure of the variable relief valve 22. The discharge passage 21 and the variable relief valve 22 are provided as described above, and hence sensors and the like that are required to adjust the thrust of the actuator A are not needed. In addition, it is not necessary to open/close the first on-off valve 9 and the second on-off valve 11 at high speed, to form the first on-off valve 9 and the second on-off valve 11 of a variable relief valve having an opening/closing function, or to highly control the motor 15 in order to adjust the discharge flow rate of the pump 12. Accordingly, the vibration damping device for railway vehicle 1 is inexpensive, and a robust system can be configured in view of both hardware and software.

It should be noted that a proportional solenoid relief valve capable of proportionally varying the valve opening pressure depending on an amount of electric current to be applied thereto is used as the variable relief valve 22, and hence the valve opening pressure is easily controlled. However, as long as the variable relief valve 22 is formed of a relief valve capable of adjusting the valve opening pressure, the variable relief valve 22 is not limited to the proportional solenoid relief valve.

Regardless of opened/closed states of the first on-off valve 9 and the second on-off valve 11, when the pressure in the rod-side chamber 5 exceeds the valve opening pressure due to excessive input to the actuator A in extending and contracting directions, the variable relief valve 22 opens the discharge passage 21 and communicates the rod-side chamber 5 to the tank 7, to thereby release the pressure in the rod-side chamber 5 to the tank 7. Accordingly, it is possible to protect the entire system of the actuator A.

In addition, the actuator A includes the damper circuit D. The damper circuit D causes the actuator A to function as a damper in a case where the first on-off valve 9 and the second on-off valve 11 are closed. The damper circuit D includes a flow straightening passage 18 which permits only a flow of the hydraulic fluid from the piston-side chamber 6 into the rod-side chamber 5, and a suction passage 19 which permits only a flow of the hydraulic fluid from the tank 7 into the piston-side chamber 6. Further, the actuator A includes the discharge passage 21 and the variable relief valve 22, and hence the variable relief valve 22 functions as a damping valve.

The flow straightening passage 18 communicates between the piston-side chamber 6 and the rod-side chamber 5, and a check valve 18a is provided in a middle of the flow straightening passage 18. The flow straightening passage 18 is formed of a one-way passage which permits only the flow of the hydraulic fluid from the piston-side chamber 6 into the rod-side chamber 5. The suction passage 19 communicates between the tank 7 and the piston-side chamber 6, and a check valve 19a is provided in a middle of the suction passage 19. The suction passage 19 is formed of a one-way passage which permits only the flow of the hydraulic fluid from the tank 7 into the piston-side chamber 6.

It should be noted that the interrupting position 9c of the first on-off valve 9 is formed of a check valve, and thus the function of the flow straightening passage 18 can be integrated into the first passage 8. The interrupting position 11c of the second on-off valve 11 is formed of a check valve, and thus the function of the suction passage 19 can be integrated into the second passage 10.

When the first on-off valve 9 and the second on-off valve 11 of the actuator A are switched to the interrupting position 9c and the interrupting position 11c, respectively, the damper circuit D communicates among the rod-side chamber 5, the piston-side chamber 6, and the tank 7 in a chain like a string of beads through the flow straightening passage 18, the suction passage 19, and the discharge passage 21. The flow straightening passage 18, the suction passage 19, and the discharge passage 21 are each formed of a one-way passage. Accordingly, when the actuator A extends and contracts due to an external force, the hydraulic fluid is surely discharged from the cylinder 2, and the discharged hydraulic fluid is returned into the tank 7 through the discharge passage 21. A shortfall of the hydraulic fluid in the cylinder 2 is supplied from the tank 7 into the cylinder 2 through the suction passage 19.

The variable relief valve 22 resists the flow of the hydraulic fluid, and thus functions as a pressure control valve for adjusting the pressure in the cylinder 2 to the valve opening pressure. Accordingly, the actuator A functions as a passive uniflow damper. It should be noted that instead of providing the variable relief valve 22 and the discharge passage 21, a passage for connecting between the rod-side chamber 5 and the tank 7, and a damping valve arranged in a middle of the passage may be provided separately so as to form the damper circuit D.

Further, when such a failure occurs that the actuator A cannot energize each equipment, the valve 9a of the first on-off valve 9 and the valve 11a of the second on-off valve 11 are pressed by the spring 9d and the spring 11d, respectively, and thus are switched to the interrupting position 9c and the interrupting position 11c, respectively. Further, the variable relief valve 22 functions as a pressure control valve in which the valve opening pressure is maximized and fixed. Accordingly, the actuator A automatically functions as a passive damper.

In a case where the actuator A is caused to exert a desired thrust in the extending direction, the controller C sets the first on-off valve 9 of the actuator A to the communicating position 9b, sets the second on-off valve 11 to the interrupting position 11c, and then rotates the motor 15, to thereby supply the hydraulic fluid from the pump 12 into the cylinder 2. In this way, the rod-side chamber 5 and the piston-side chamber 6 are communicated to each other, and the hydraulic fluid is supplied from the pump 12 into the rod-side chamber 5 and the piston-side chamber 6. Thus, the piston 3 is pressed to the left side of FIG. 2, and the actuator A exerts the thrust in the extending direction.

When the pressure in the rod-side chamber 5 and the pressure in the piston-side chamber 6 exceed the valve opening pressure of the variable relief valve 22, the variable relief valve 22 is opened, and the hydraulic fluid is released through the discharge passage 21 into the tank 7. Accordingly, the pressure in the rod-side chamber 5 and the pressure in the piston-side chamber 6 are controlled by the valve opening pressure of the variable relief valve 22 that is determined depending on the electric current applied to the variable relief valve 22.

Therefore, the actuator A exerts, in the extending direction, the thrust corresponding to a value obtained by multiplying the difference in the pressure receiving area of the piston 3 between the piston-side chamber 6 side and the rod-side chamber 5 side by the above-mentioned pressure in the rod-side chamber 5 or the above-mentioned pressure in the piston-side chamber 6 that is controlled by the variable relief valve 22.

On the other hand, in a case where the actuator A is caused to exert a desired thrust in the contracting direction, the controller C sets the first on-off valve 9 of the actuator A to the interrupting position 9c, sets the second on-off valve 11 to the communicating position 11b, and then rotates the motor 15, to thereby supply the hydraulic fluid from the pump 12 into the rod-side chamber 5. In this way, the piston-side chamber 6 and the tank 7 are communicated to each other, and the hydraulic fluid is supplied from the pump 12 into the rod-side chamber 5. Thus, the piston 3 is pressed to the right side of FIG. 2, and the actuator A exerts the thrust in the contracting direction.

Similarly, the amount of electric current of the variable relief valve 22 is adjusted, and thus the actuator A exerts, in the contracting direction, the thrust corresponding to a value obtained by multiplying the pressure receiving area of the piston 3 on the rod-side chamber 5 side by the pressure in the rod-side chamber 5 that is controlled by the variable relief valve 22.

The actuator A can function not only as an actuator, but also as a damper through only the opening/closing of the first on-off valve 9 and the second on-off valve 11 regardless of a drive condition of the motor 15. Accordingly, it is not necessary to perform troublesome and quick valve switching operation, and hence it is possible to improve responsiveness and reliability of the system.

Further, the actuator A is an actuator of a single-rod type, and hence a stroke length is easily secured when compared to an actuator of a double-rod type. Accordingly, it is possible to reduce an entire length of the actuator, and to improve mountability on the railway vehicle.

Still further, a flow of the hydraulic fluid in the actuator A caused by supply of the hydraulic fluid from the pump 12 and by the extension/contraction operation is circulated to pass through the rod-side chamber 5 and the piston-side chamber 6 in order, and finally return into the tank 7. Accordingly, even when a gas is mixed into the rod-side chamber 5 or the piston-side chamber 6, the gas is spontaneously discharged into the tank 7 by the extension/contraction operation of the actuator A, and hence it is possible to prevent deterioration of responsiveness to thrust generation.

Therefore, in manufacture of the actuator A, complicated assembly in an oil or assembly under a vacuum environment is not required, and high-level deaeration of the hydraulic fluid is not needed. Accordingly, it is possible to improve productivity, and to reduce manufacturing cost.

In addition, even when the gas is mixed into the rod-side chamber 5 or the piston-side chamber 6, the gas is spontaneously discharged into the tank 7 by the extension/contraction operation of the actuator A, and hence it is not necessary to often perform maintenance for performance recovery. As a result, it is possible to reduce labor hours and cost burden in terms of maintenance.

Figure 3:
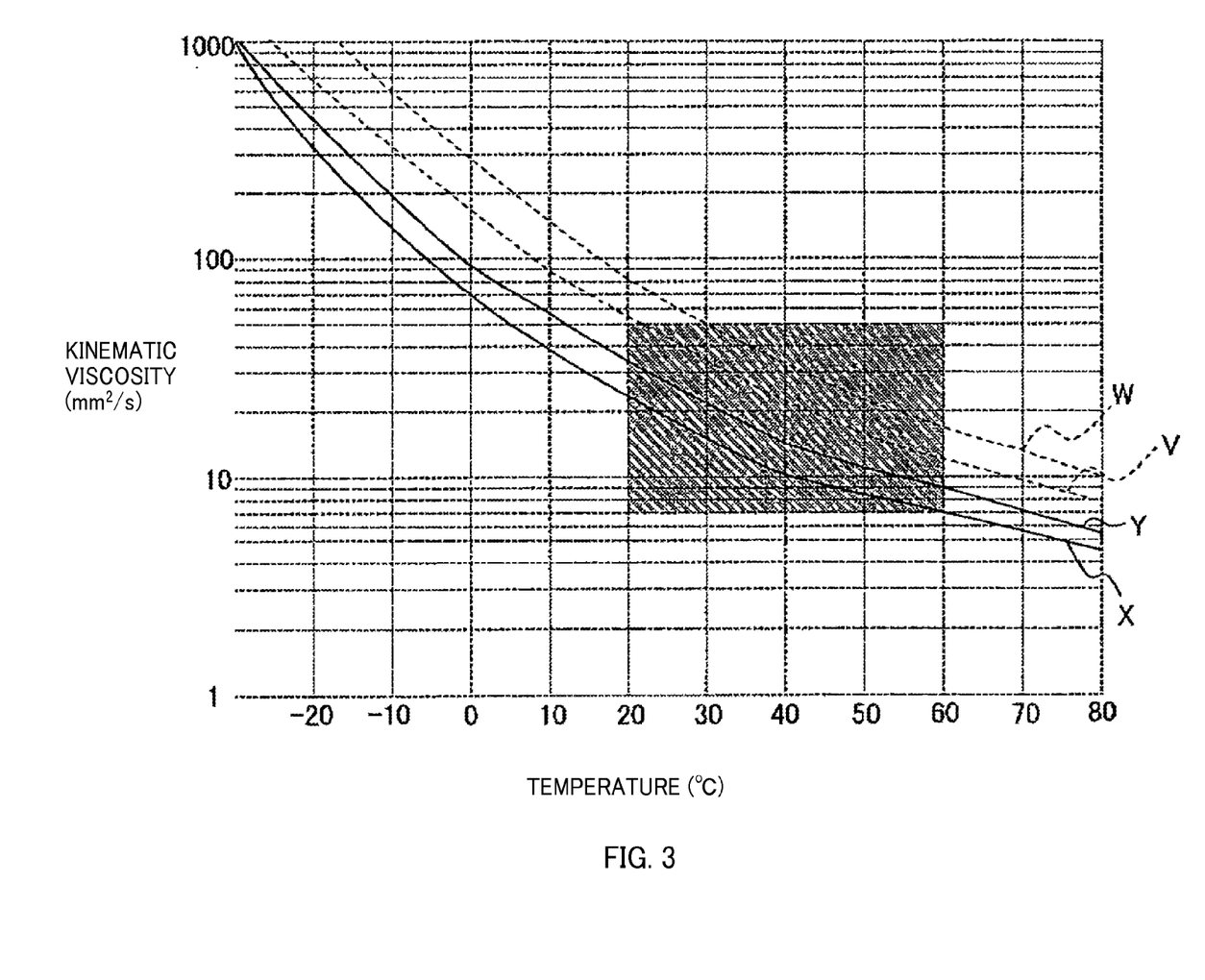
FIG. 3 is a graph showing kinematic viscosity-temperature characteristics of a mineral oil.

By the way, as shown in FIG. 3, the hydraulic fluid used in the actuator A has such kinematic viscosity-temperature characteristics that a kinematic viscosity of the hydraulic fluid ranges from 7 mm$^2$/s to 50 mm$^2$/s in a temperature range of from 20° C. to 60° C. For example, in a case where a mineral oil is used as the hydraulic fluid, an oil, which is classified as VG10 (a line X of FIG. 3) or VG15 (a line Y of FIG. 3) in viscosity grades for industrial lubricants set by International Organization for Standardization (ISO), satisfies this condition.

The actuator A of the vibration damping device for railway vehicle 1 is interposed between the body B and the truck Tf of the railway vehicle and between the body B and the truck Tr thereof, that is, situated at a well-ventilated position, and is always exposed to the outside air. Further, in a case where it is not necessary to cause the actuator A to actively generate the thrust, for example, in a case where the railway vehicle travels at middle or low speed, the damper circuit D functions so as to cause the actuator A to function as a passive damper, and hence the pump 12 is not activated. As described above, the pump 12 is not always activated, and hence a temperature of the hydraulic fluid in the actuator A is not significantly increased, but is influenced by a temperature of the outside air surrounding the actuator A. A range of a temperature environment for use of the railway vehicle is about from −20° C. to +60° C. Accordingly, the temperature of the hydraulic fluid in the actuator A ranges about from −20° C. to +60° C.

On the other hand, a kinematic viscosity of the hydraulic fluid suitable for driving the pump 12 is in a range of from 7 mm$^2$/s to 50 mm$^2$/s (range hatched in FIG. 3). When the kinematic viscosity of the hydraulic fluid is lower than 7 mm$^2$/s, there is a fear of a seizure of the pump 12. When the kinematic viscosity of the hydraulic fluid exceeds 50 mm$^2$/s, the kinematic viscosity is extremely high, and thus a basic pressure loss in a hydraulic circuit of the actuator A is increased, with the result that the pressure in the cylinder 2 is increased. Accordingly, a lower limit of the thrust to be generated by the actuator A is high, and hence the actuator A cannot exert a small thrust. Therefore, particularly when controlling the thrust using feedback control, the thrust is excessive, and hence hunting of the thrust of the actuator A occurs at high frequency.

With reference to FIG. 3, a kinematic viscosity of the hydraulic fluid as VG10 exceeds 50 mm$^2$/s at a temperature of around 5° C., and a kinematic viscosity of the hydraulic fluid as VG15 exceeds 50 mm$^2$/s at a temperature of around 12° C. However, the inventors of the present invention found out the following. Specifically, in a case of using a hydraulic fluid having such kinematic viscosity-temperature characteristics that a kinematic viscosity of the hydraulic fluid ranges from 7 mm$^2$/s to 50 mm$^2$/s in a temperature range of from 20° C. to 60° C., even when a kinematic viscosity of the hydraulic fluid exceeds 50 mm$^2$/s, the pump 12 is driven at rotational speed lower than the predetermined normal rotational speed, and thus the basic pressure loss is reduced. In this way, it is possible to suppress an excessive thrust, and to prevent hunting.

For example, in a case where the kinematic viscosity of the hydraulic fluid exceeds 50 mm$^2$/s, the rotational speed for the pump 12 is reduced to about a half of the normal rotational speed, and thus the basic pressure loss can be reduced. In actual use, it is possible to satisfactorily reduce a lower limit value of a thrust that can be generated by the actuator A, and to prevent hunting. That is, in a case where a temperature, at which a kinematic viscosity of the hydraulic fluid as VG10 used in the actuator A exceeds 50 mm$^2$/s, is 5° C., it is only necessary to reduce the rotational speed for the pump 12 than the normal rotational speed when the hydraulic fluid has a temperature of 5° C. or less. Further, in a case where a temperature, at which a kinematic viscosity of the hydraulic fluid as VG15 used in the actuator A exceeds 50 mm$^2$/s, is 12° C., it is only necessary to reduce the rotational speed for the pump 12 than the normal rotational speed when the hydraulic fluid has a temperature of 12° C. or less.

Further, the inventors of the present invention found out the following. Specifically, in a case of using a hydraulic fluid having such kinematic viscosity-temperature characteristics that a kinematic viscosity of the hydraulic fluid does not range from 7 mm$^2$/s to 50 mm$^2$/s in a temperature range of from 20° C. to 60° C., for example, using a hydraulic fluid having such kinematic viscosity-temperature characteristics that a kinematic viscosity of the hydraulic fluid exceeds 50 mm$^2$/s at a temperature of 20° C., even when the rotational speed for the pump 12 is reduced, the lower limit of the thrust is extremely large, and hence hunting cannot be suppressed appropriately.

For example, in a case where a mineral oil is used as the hydraulic fluid, as shown in FIG. 3, an oil as VG22 (a broken line V of FIG. 3) and an oil as VG32 (a broken line W of FIG. 3) each have an extremely high temperature when a kinematic viscosity of each of VG22 and VG32 is 50 mm²/s, and hence the lower limit of the thrust is extremely large even when the rotational speed for the pump 12 is reduced. As a result, hunting cannot be suppressed appropriately. In addition, in a case of using a hydraulic fluid having a kinematic viscosity of less than 7 mm²/s at a temperature of 60° C., there is a fear of the seizure of the pump 12, and hence this hydraulic fluid cannot be used in the actuator A.

As described above, in actual use, the hydraulic fluid, which has such kinematic viscosity-temperature characteristics that the kinematic viscosity of the hydraulic fluid ranges from 7 mm²/s to 50 mm²/s in a temperature range of from 20° C. to 60° C., can prevent hunting of the thrust of the actuator A.

On the other hand, in a case where the damper circuit D causes the actuator A to function as a passive damper, the kinematic viscosity of the hydraulic fluid most suitable for a damper is in a range of from 3 mm²/s to 50 mm²/s. Even when the kinematic viscosity exceeds 50 mm²/s, the function as a damper is not lost. However, if the kinematic viscosity is extremely high, an excessive damping force is applied, and hence a ride quality in the vehicle may be deteriorated. In a case of using a hydraulic fluid having a kinematic viscosity of more than 50 mm²/s at a temperature of 20° C., the basic pressure loss is increased, and hence the lower limit of the thrust is excessive even when the rotational speed for the pump 12 is reduced.

Therefore, the hydraulic fluid having the kinematic viscosity of 7 mm²/s to 50 mm²/s in the temperature range of from 20° C. to 60° C. is used in the actuator A, and thus it is possible to obtain both a function as an actuator and a function as a damper under a use temperature environment for the railway vehicle (in a range of about −20° C. to +60° C.).

The vibration damping device for railway vehicle 1 uses the hydraulic fluid having such kinematic viscosity-temperature characteristics that the kinematic viscosity of the hydraulic fluid ranges from 7 mm²/s to 50 mm²/s in the temperature range of from 20° C. to 60° C., and thus prevents hunting under the use temperature environment for the railway vehicle (in the range of about −20° C. to +60° C.). Further, in a case where the vibration damping device for railway vehicle 1 is used in a temperature zone in which the kinematic viscosity of the hydraulic fluid in the actuator A exceeds 50 mm²/s, the rotational speed for the pump 12 is reduced than the normal rotational speed. Accordingly, it is possible to reduce the basic pressure loss, and in actual use, it is possible to satisfactorily reduce the lower limit value of the thrust that can be generated by the actuator A, with the result that hunting can be prevented. In this way, the vibration damping device for railway vehicle 1 can prevent hunting of the thrust even when the temperature of the hydraulic fluid is low. As a result, the vibration damping device for railway vehicle 1 can exert the stable thrust, and effectively suppress vibration of the body.

Here, in a case where the kinematic viscosity of the hydraulic fluid in the actuator A exceeds 50 mm²/s, the rotational speed for the pump 12 is reduced than the normal rotational speed. However, whether or not the kinematic viscosity of the hydraulic fluid exceeds 50 mm²/s can be determined based on the temperature of the hydraulic fluid because the kinematic viscosity of the hydraulic fluid becomes higher as the temperature of the hydraulic fluid becomes lower. For example, the controller C measures the temperature of the hydraulic fluid, to thereby determine based on the measurement result whether or not the kinematic viscosity exceeds 50 mm²/s. In a case where the controller C determines that the kinematic viscosity exceeds 50 mm²/s, the controller C adjusts the rotational speed of the motor 15, and thus reduces the rotational speed for the pump 12 than the normal rotational speed.

Further, the temperature of the hydraulic fluid is approximate to the outside air temperature surrounding the vibration damping device for railway vehicle 1, and hence the controller C may measure the outside air temperature instead of the temperature of the hydraulic fluid, to thereby determine based on the outside air temperature whether or not the kinematic viscosity exceeds 50 mm²/s. Further, whether or not the railway vehicle travels in the winter season can be determined based on the date, whether or not the railway vehicle travels at early morning or at night can be determined based on the time, and whether or not the railway vehicle passes through a cold region can be determined based on a traveling section. Accordingly, the controller C may estimate the temperature of the hydraulic fluid based on the date, the time, and spot information, and thus reduce the rotational speed for the pump 12 than the normal rotational speed based on the estimation result.

Figure 4:
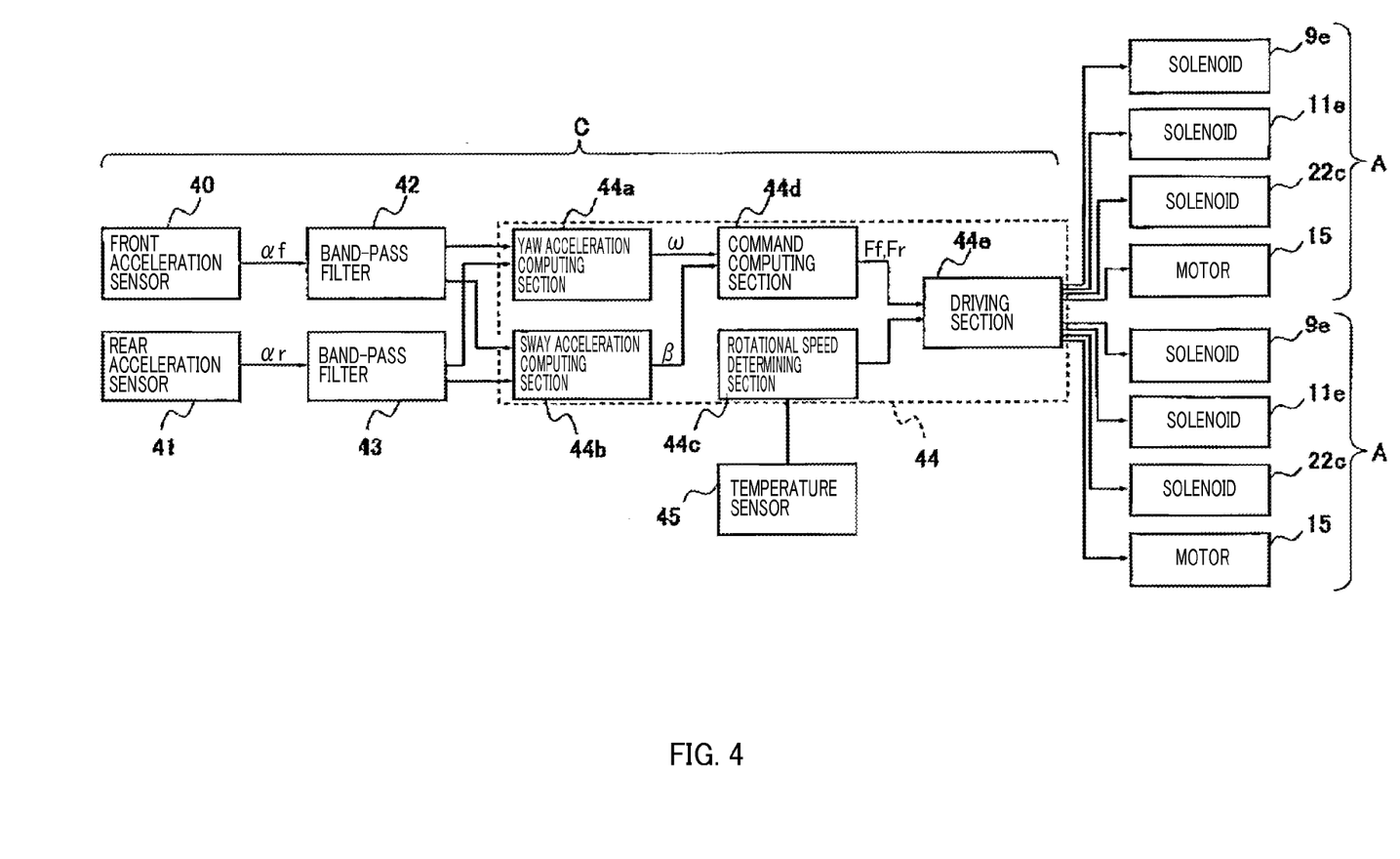
FIG. 4 is a control block diagram of a controller of the vibration damping device for railway vehicle according to the embodiment of the present invention.

As illustrated in FIGS. 1, 2, and 4, the controller C includes a front acceleration sensor 40, a rear acceleration sensor 41, band-pass filters 42, 43, a control unit 44, and a temperature sensor 45, and controls the thrust of each actuator A. The front acceleration sensor 40 detects the lateral acceleration αf of the front portion Bf of the body as a front side of the body that is produced in the horizontal direction with respect to the vehicle advancing direction. The rear acceleration sensor 41 detects the lateral acceleration αr of the rear portion Br of the body as a rear side of the body that is produced in the horizontal direction with respect to the vehicle advancing direction. The band-pass filters 42, 43 eliminate a drift component, a noise, and a steady acceleration at the time of curve traveling contained in the lateral acceleration αf and the lateral acceleration αr. The control unit 44 processes the lateral acceleration αf and the lateral acceleration αr filtered by the band-pass filters 42, 43 so as to output control commands to the motor 15, the solenoid 9e of the first on-off valve 9, the solenoid 11e of the second on-off valve 11, and the proportional solenoid 22c of the variable relief valve 22 of each actuator A. The temperature sensor 45 detects the temperature of the hydraulic fluid in each actuator A. It should be noted that the steady acceleration at the time of curve traveling contained in the lateral acceleration αf and the lateral acceleration αr is eliminated by the band-pass filters 42, 43, and hence it is possible to suppress only vibration that degrades the ride quality.

The control unit 44 includes a yaw acceleration computing section 44a, a sway acceleration computing section 44b, a rotational speed determining section 44c, a command computing section 44d, and a driving section 44e. The yaw acceleration computing section 44a computes the yaw acceleration ω that is produced about the center G of the body directly above the truck Tf and the truck Tr based on the front lateral acceleration αf detected by the front acceleration sensor 40 and the rear lateral acceleration αr detected by the rear acceleration sensor 41. The sway acceleration computing section 44b computes the sway acceleration β that is produced in the lateral direction at the center G of the body B based on the lateral acceleration αf and the lateral acceleration αr. The rotational speed determining section 44c determines the rotational speed for the pump 12 based on the temperature of the hydraulic fluid obtained from the temperature sensor 45. The command computing section 44d computes the control force command values Ff, Fr corresponding to the thrusts to be generated by the front and rear actuators A individually based on the yaw acceleration ω and the sway acceleration β. The driving section 44e drives the motor 15, the solenoid 9e of the first on-off valve 9, the solenoid 11e of the second on-off valve 11, and the proportional solenoid 22c of the variable relief valve 22 based on the control force command values Ff, Fr and the rotational speed for the pump 12 determined by the rotational speed determining section 44c.

The driving section 44e drives the motor 15 in accordance with determination of the rotational speed determining section 44c. The rotational speed determining section 44c compares a predetermined reference temperature to the temperature of the hydraulic fluid detected by the temperature sensor 45. The reference temperature is set to satisfy a condition that the kinematic viscosity of the hydraulic fluid used in the actuator A exceeds 50 mm$^2$/s.

In a case where the temperature of the hydraulic fluid is equal to or higher than the reference temperature, the rotational speed determining section 44c outputs a command to the driving section 44e so as to rotate the pump 12 of the actuator A at the predetermined normal rotational speed. In a case where the temperature of the hydraulic fluid is lower than the reference temperature, the rotational speed determining section 44c outputs a command to the driving section 44e so as to rotate the pump 12 of the actuator A at the rotational speed lower than the normal rotational speed. In a case where the rotational speed for the pump 12 is reduced, the rotational speed for the pump 12 may be reduced depending on the temperature of the hydraulic fluid, or reduced to the rotational speed lower than the predetermined normal rotational speed. The reference temperature is determined depending on characteristics of the hydraulic fluid for use. The temperature sensor 45 is installed in the cylinder 2, the tank 7, each passage of the actuator A, and the like, and detects the temperature of the hydraulic fluid.

It should be noted that in a case where the rotational speed determining section 44c determines that the temperature of the hydraulic fluid is lower than the reference temperature, and then the motor 15 is driven so as to rotate the pump 12 at the constant rotational speed lower than the predetermined normal rotational speed, the constant rotational speed is set to be capable of outputting the lower limit thrust required for the actuator A. As control of the rotational speed of the motor 15 driven by the driving section 44e, general feedback control having a speed loop may be employed, or another control method may be employed.

Although not shown as hardware resources, for example, the controller C includes an A/D converter for capturing signals output by the front acceleration sensor 40 and the rear acceleration sensor 41, the band-pass filters 42, 43, a storage device such as a read only memory (ROM) that stores a program for capturing the lateral acceleration αf and the lateral acceleration αr filtered by the band-pass filters 42, 43 and performing processes required to control the actuators A, a computing device such as a central processing unit (CPU) for carrying out the processes based on the program, and a storage device such as a random access memory (RAM) for providing a storage region for the above-mentioned CPU. The CPU carries out the program for performing the processes, and thus the functions of the sections 44a to 44e of the control unit 44 of the controller C are exerted. Further, the functions of the band-pass filters 42, 43 can be incorporated into the program.

The lateral accelerations αf, αr are set to be positive when vectors of the lateral accelerations αf, αr are directed to the upper side of FIG. 1 with reference to an axis passing the center of the body B in the right-and-left direction of FIG. 1, and are set to be negative when the vectors of the lateral accelerations αf, αr are directed to the lower side of FIG. 1. The yaw acceleration computing section 44a computes the yaw acceleration ω produced about the center G of the body directly above the front truck Tf and the rear truck Tr by dividing a difference between the front lateral acceleration αf and the rear lateral acceleration αr by 2. The sway acceleration computing section 44b computes the sway acceleration β produced at the center G of the body B by dividing the sum of the lateral acceleration αf and the lateral acceleration αr by 2.

The front acceleration sensor 40 and the rear acceleration sensor 41 are used to obtain the yaw acceleration ω, and hence it is preferred that the front acceleration sensor 40 be arranged near the front actuator A and on a line containing the center G of the body B and extending in a fore-and-aft direction or a diagonal direction, and that the rear acceleration sensor 41 be arranged near the rear actuator A and on the line containing the center G of the body B and extending in the fore-and-aft direction or the diagonal direction. Further, the yaw acceleration ω is obtained based on distances and positional relationships between the center G and the front acceleration sensor 40 and between the center G and the rear acceleration sensor 41 and based on the lateral accelerations αf, αr, and hence the front acceleration sensor 40 and the rear acceleration sensor 41 may be arranged at arbitrary positions. In this case, the yaw acceleration ω is obtained, instead of dividing the difference between the lateral acceleration αf and the lateral acceleration αr by 2, using the difference between the lateral acceleration αf and the lateral acceleration αr and using the distances and the positional relationships between the center G of the body B and the front acceleration sensor 40 and between the center G and the rear acceleration sensor 41. Specifically, when Lf represents a distance in the fore-and-aft direction between the front acceleration sensor 40 and the center G of the body B, and Lr represents a distance in the fore-and-aft direction between the rear acceleration sensor 41 and the center G of the body B, the yaw acceleration ω is calculated as ω=(αf−αr)/(Lf+Lr). It should be noted that the front acceleration sensor 40 and the rear acceleration sensor 41 detect the accelerations, and thus the yaw acceleration ω is calculated. However, the yaw acceleration ω may be detected using a yaw acceleration sensor.

It should be noted that the rotational speed determining section 44c compares the temperature of the hydraulic fluid in the actuator A to the reference temperature, to thereby determine the rotational speed for the pump 12. Instead of this, the rotational speed determining section 44c may estimate the temperature of the hydraulic fluid based on information other than the temperature, to thereby determine the rotational speed for the pump 12 based on the estimated temperature of the hydraulic fluid. For example, the temperature of the hydraulic fluid is estimated based on date information. That is, in a case where the obtained date belongs to a period of winter season, the rotational speed determining section 44c determines that the temperature of the hydraulic fluid is lower than the reference temperature, to thereby determine the rotational speed for the pump 12. The temperature of the hydraulic fluid is low in the period of winter season, and hence it is possible to estimate the temperature of the hydraulic fluid based on the date information in the above-mentioned manner.

The period of winter season may be set to, for example, a period from November to February based on only the month of the date. However, the period of winter season is set to, for example, a period from November 16 to February 20 based on the day of the date, and thus it is possible to estimate the temperature of the hydraulic fluid more accurately. The date information may be obtained from a clock calendar of the CPU as the hardware of the control unit 44, or obtained from external equipment provided outside the controller C. For example, the date information may be obtained from a vehicle monitor for monitoring various pieces of information of the railway vehicle. In a case where the date information is obtained from the external equipment, the date information may be obtained from the external equipment through communication irrespective of wired or wireless communication.

Further, the temperature of the hydraulic fluid can be estimated based on, besides the date information, air temperature information of a traveling region of the railway vehicle. In this case, when the traveling region belongs to the cold region, it is possible to determine that the estimated temperature of the hydraulic fluid in the actuator A is lower than the reference temperature, and then the rotational speed for the pump 12 is determined based on the determination. That is, it is only necessary that the air temperature information enables the rotational speed determining section 44c to determine whether or not the temperature of the hydraulic fluid may be lower than the reference temperature.

As described above, the rotational speed determining section is not required to strictly estimate the temperature of the hydraulic fluid, but required to determine whether or not the estimated temperature of the hydraulic fluid is lower than the reference temperature. Accordingly, when using, for example, the air temperature information, it is only necessary to make determination based on an average air temperature or a lowest air temperature in the traveling region. Further, the air temperature information may be set to be different from date to date even in the same region. That is, the temperature of the hydraulic fluid may be estimated using a map or a table in which the air temperature information and the date information are associated with each other, to thereby determine whether or not the temperature of the hydraulic fluid is lower than the reference temperature.

In addition, the rotational speed determining section 44c may determine based on a traveling position of the railway vehicle whether or not the temperature of the hydraulic fluid is lower than the reference temperature. The rotational speed determining section 44c monitors the traveling position using the vehicle monitor, a global positioning system (GPS), or another device capable of monitoring the traveling position, and estimates the temperature of the hydraulic fluid with reference to the air temperature information of the region at the present traveling position, to thereby determine whether or not the temperature of the hydraulic fluid is lower than the reference temperature. In this way, in a case where the railway vehicle travels in a line extending over a warm region and the cold region, it is possible to estimate the temperature of the hydraulic fluid depending on the traveling position.

Further, the air temperature information of the region including the traveling position may be set to vary depending on the date. In this case, the map or the table in which the air temperature information and the date information are associated with each other is prepared, and the temperature of the hydraulic fluid is estimated with reference to the map or the table of the region including the traveling position.

As described above, the rotational speed determining section 44c can determine based on at least one of the date information, the air temperature information, and the traveling position whether or not the temperature of the hydraulic fluid is lower than the reference temperature, and may further estimate the temperature of the hydraulic fluid in consideration of time information. In this way, the rotational speed determining section 44c can make different determinations depending on the time. Even on the same date, the rotational speed determining section 44c can determine during a daytime that the temperature of the hydraulic fluid is not lower than the reference temperature, and can determine at early morning or at night that the temperature of the hydraulic fluid is lower than the reference temperature. Accordingly, the rotational speed determining section 44c can estimate the temperature of the hydraulic fluid more delicately, and can determine the rotational speed for the pump 12 suitable for the actuator A. Similarly, the air temperature information is associated with the time, and thus in a case of estimating the temperature of the hydraulic fluid based on the air temperature information or the traveling position, the rotational speed determining section 44c can determine the rotational speed more delicately.

In addition, the rotational speed determining section 44c may estimate the temperature of the hydraulic fluid based on an operation time period that has elapsed from a start of the actuator A, and thus may determine whether or not the temperature of the hydraulic fluid is lower than the reference temperature. Shortly after the start of the actuator A, the temperature of the hydraulic fluid in the actuator A is low, and hence it is possible to estimate that the temperature of the hydraulic fluid is lower than the reference temperature until the temperature of the hydraulic fluid increases. Therefore, the operation time period as a threshold is set to be long enough to satisfactorily raise the temperature of the hydraulic fluid in the actuator A and to satisfactorily reduce a viscosity of the hydraulic fluid.

It should be noted that estimation of the temperature of the hydraulic fluid based on the operation time period may be used in combination with estimation of the temperature of the hydraulic fluid based on the date information, the air temperature information, the traveling position, or the time information described above. In this way, the temperature of the hydraulic fluid is estimated using various pieces of information, and thus the temperature sensor is not needed, with the result that it is possible to reduce cost of the vibration damping device for railway vehicle 1.

Figure 5:
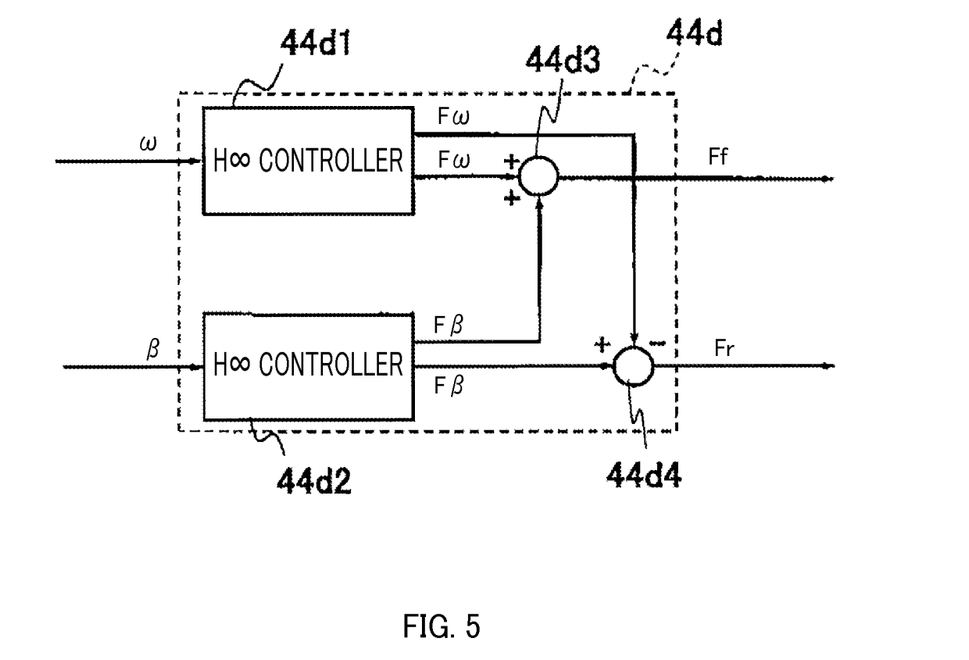
FIG. 5 is a control block diagram of a command computing section of the controller of the vibration damping device for railway vehicle according to the embodiment of the present invention.

Next, as illustrated in FIG. 5, the command computing section 44d includes H∞ controllers 44d1, 44d2, an adder 44d3, and a subtracter 44d4. The H∞ controller 44d1 computes a control force Fω that suppresses yaw of the body B based on the yaw acceleration ω computed by the yaw acceleration computing section 44a. The H∞ controller 44d2 computes a control force Fβ that suppresses sway of the body B based on the sway acceleration β computed by the sway acceleration computing section 44b. The adder 44d3 adds the control force Fω and the control force Fβ to obtain the control force command value Ff indicating the thrust that is to be output by the front actuator A. The subtracter 44d4 subtracts the control force Fω from the control force Fβ to obtain the control force command value Fr indicating the thrust that is to be output by the rear actuator A.

Referring back to FIG. 4, the driving section 44e gives the control commands to the respective actuators A so as to cause the actuators A to exert the thrusts in accordance with the control force command values Ff, Fr. Based on the control force command values Ff, Fr, the driving section 44e obtains the control commands that are to be given to the solenoid 9e of the first on-off valve 9, the solenoid 11e of the second on-off valve 11, and the proportional solenoid 22c of the variable relief valve 22 of each actuator A, and outputs the control commands. It should be noted that when the control commands are obtained based on the control force command values Ff, Fr, feedback of the thrusts that are currently output by the actuators A may be performed, and thus the control commands may be obtained.

The command computing section 44d performs H∞ control, and hence can obtain a high vibration damping effect irrespective of a frequency of vibration to be input to the body B, and also can obtain a high robustness. It should be noted that control other than Hoc control may be used. For example, the front and rear actuators A may be controlled using skyhook control in which a lateral velocity is calculated based on the lateral accelerations αf, αr and the control force command value is obtained by multiplying the lateral velocity by a skyhook damping coefficient. Further, instead of associating the front actuator A and the rear actuator A with each other, the front actuator A and the rear actuator A may be controlled independently based on the yaw acceleration ω and the sway acceleration β.

The driving section 44e further drives the motor 15 so as to rotate the pump 12 based on the determination result of the rotational speed determining section 44c. In a case where the temperature of the hydraulic fluid is equal to or higher than the reference temperature, the pump 12 is rotated at the predetermined normal rotational speed, and thus the thrust of each actuator A can be adjusted by the variable relief valve 22. Accordingly, it is not necessary to vary the rotational speed for the pump 12, and it is possible to prevent generation of noises accompanied with variation of the rotational speed for the pump 12, and to improve control responsiveness of the actuator A. It should be noted that the thrust to be generated by the actuator A can be adjusted also by both the variable relief valve 22 and the rotational speed of the motor 15.

According to the vibration damping device for railway vehicle 1 of this embodiment, even in a case where the actuator A is caused to exert a relatively small thrust under the use temperature environment for the railway vehicle, excessive thrust can be prevented.

Therefore, in a case of feedback control of the thrust of each actuator A, even when the temperature of the hydraulic fluid is low and the viscosity thereof is high, the thrust does not become excessive, and hence a deviation between the control force command value Ff, Fr and the thrust to be actually output is not increased. Thus, it is possible to prevent occurrence of hunting in which the thrust of the actuator A is vibrational, and to prevent deterioration of a vibration condition due to shaking of the body B of the railway vehicle. Accordingly, even when the temperature of the hydraulic fluid is low, the stable thrust can be exerted, and vibration of the body can be effectively suppressed.

In addition, occurrence of hunting is prevented, and hence it is possible to prevent frequent switching operation of the first on-off valve 9 and the second on-off valve 11, and to prevent deterioration of economic efficiency due to reduction in lives of the first on-off valve 9 and the second on-off valve 11.

The embodiments of the present invention described above are merely illustration of some application examples of the present invention and not of the nature to limit the technical scope of the present invention to the specific constructions of the above embodiments.

The present application claims a priority based on Japanese Patent Application No. 2011-175562 filed with the Japan Patent Office on Aug. 11, 2011, all the contents of which are hereby incorporated by reference.

The invention claimed is:

1. A vibration damping device for railway vehicle suppressing vibration of a body of a railway vehicle, the vibration damping device for railway vehicle comprising:
   an actuator including:
      a cylinder coupled to one of a truck and the body of the railway vehicle; a piston slidably inserted into the cylinder;
      a rod inserted into the cylinder and coupled to the piston and another one of the truck and the body;
      a rod-side chamber and a piston-side chamber partitioned by the piston inside the cylinder;
      a tank;
      a first on-off valve provided in a middle of a first passage that communicates between the rod-side chamber and the piston-side chamber;
      a second on-off valve provided in a middle of a second passage that communicates between the piston-side chamber and the tank; and
      a pump capable of supplying a hydraulic fluid into the rod-side chamber;
   a damper circuit adapted to cause the actuator to function as a damper under a state in which the first on-off valve and the second on-off valve are closed; and
   a controller adapted to control the actuator so as to suppress vibration of the body of the railway vehicle by obtaining, based on a lateral acceleration in a horizontal direction with respect to an advancing direction of the railway vehicle, a control force command value to perform feedback control to cause the actuator to generate a thrust,
   wherein the hydraulic fluid has such kinematic viscosity-temperature characteristics that a kinematic viscosity of the hydraulic fluid is in a range of 7 mm$^2$/s to 50 mm$^2$/s over an entire temperature range of 20° C. to 60° C., and
   the controller causes the pump to be rotated and driven at a predetermined normal rotational speed, and when the kinematic viscosity of the hydraulic fluid in the actuator exceeds 50 mm$^2$/s, the controller causes the pump to be rotated and driven at a rotational speed lower than the normal rotational speed.

2. The vibration damping device for railway vehicle according to claim 1, further comprising a rotational speed determining section adapted to determine the rotational speed for the pump, wherein
   the rotational speed determining section estimates a temperature of the hydraulic fluid in the actuator, and compares the estimated temperature to a reference temperature satisfying a condition that the kinematic viscosity of the hydraulic fluid is 50 mm$^2$/s, to thereby determine the rotational speed for the pump.

3. The vibration damping device for railway vehicle according to claim 2, wherein
   the rotational speed determining section estimates the temperature of the hydraulic fluid in the actuator based on at least one of date information, a traveling position of the railway vehicle, air temperature information of a traveling region of the railway vehicle, time information, and an operation time period of the actuator.

4. The vibration damping device for railway vehicle according to claim 1, wherein
   the hydraulic fluid is a mineral oil.

5. The vibration damping device for railway vehicle according to claim 1, wherein
   the actuator further includes a discharge passage that connects the rod-side chamber to the tank, and a variable relief valve that is provided in a middle of the discharge passage and is capable of varying a valve opening pressure.

6. The vibration damping device for railway vehicle according to claim 1, wherein
   the damper circuit includes suction passage that permits only a flow of a fluid from the tank into the piston-side chamber, and a flow straightening passage that permits only a flow of the fluid from the piston-side chamber into the rod-side chamber.

7. A vibration damping device for railway vehicle suppressing vibration of a body of a railway vehicle, the vibration damping device for railway vehicle comprising:
- an actuator including:
  - a cylinder coupled to one of a truck and the body of the railway vehicle; a piston slidably inserted into the cylinder;
  - a rod inserted into the cylinder and coupled to the piston and another one of the truck and the body;
  - a rod-side chamber and a piston-side chamber partitioned by the piston inside the cylinder;
  - a tank;
  - a first on-off valve provided in a middle of a first passage that communicates between the rod-side chamber and the piston-side chamber;
  - a second on-off valve provided in a middle of a second passage that communicates between the piston-side chamber and the tank; and
  - a pump capable of supplying a hydraulic fluid into the rod-side chamber;
- a damper circuit adapted to cause the actuator to function as a damper under a state in which the first on-off valve and the second on-off valve are closed; and
- a controller adapted to control the actuator so as to suppress vibration of the body of the railway vehicle by obtaining, based on a lateral acceleration in a horizontal direction with respect to an advancing direction of the railway vehicle, a control force command value to perform feedback control to cause the actuator to generate a thrust, wherein
- the hydraulic fluid has such kinematic viscosity-temperature characteristics that a kinematic viscosity of the hydraulic fluid is in a range of 7 mm$^2$/s to 50 mm$^2$/s over an entire temperature range of 20° C. to 60° C. so as to prevent hunting of the thrust over an entire temperature range of −20° C. to 60° C., and
- the controller causes the pump to be rotated and driven at a predetermined normal rotational speed, and when the kinematic viscosity of the hydraulic fluid in the actuator exceeds 50 mm$^2$/s, the controller causes the pump to be rotated and driven at a rotational speed lower than the normal rotational speed.

8. A vibration damping device for railway vehicle suppressing vibration of a body of a railway vehicle, the vibration damping device for railway vehicle comprising:
- an actuator including:
  - a cylinder coupled to one of a truck and the body of the railway vehicle; a piston slidably inserted into the cylinder;
  - a rod inserted into the cylinder and coupled to the piston and another one of the truck and the body;
  - a rod-side chamber and a piston-side chamber partitioned by the piston inside the cylinder;
  - a tank;
  - a first on-off valve provided in a middle of a first passage that communicates between the rod-side chamber and the piston-side chamber;
  - a second on-off valve provided in a middle of a second passage that communicates between the piston-side chamber and the tank; and
  - a pump capable of supplying a hydraulic fluid into the rod-side chamber;
- a damper circuit adapted to cause the actuator to function as a damper under a state in which the first on-off valve and the second on-off valve are closed; and
- a controller adapted to control the actuator so as to suppress vibration of the body of the railway vehicle by obtaining, based on a lateral acceleration in a horizontal direction with respect to an advancing direction of the railway vehicle, a control force command value to perform feedback control to cause the actuator to generate a thrust, wherein
- the hydraulic fluid has such kinematic viscosity-temperature characteristics that a kinematic viscosity of the hydraulic fluid is in a range of 7 mm$^2$/s to 50 mm$^2$/s over an entire temperature range of 20° C. to 60° C., and is out of the range of 7 mm$^2$/s to 50 mm$^2$/s in at least a part of a temperature range of −20° C. to 20° C., and
- the controller causes the pump to be rotated and driven at a predetermined normal rotational speed, and when the kinematic viscosity of the hydraulic fluid in the actuator exceeds 50 mm$^2$/s, the controller causes the pump to be rotated and driven at a rotational speed lower than the normal rotational speed.

* * * * *